United States Patent
Nagashima et al.

(10) Patent No.: US 6,582,625 B2
(45) Date of Patent: Jun. 24, 2003

(54) PROCESS FOR PRODUCING THERMOTROPIC LIQUID CRYSTALLINE POLYMER

(75) Inventors: Tohru Nagashima, Tsukuba (JP); Koichi Mizumoto, Tsukuba (JP); Hiroshi Harada, Osaka (JP)

(73) Assignee: Sumitomo Chemical Company, Limited, Osaka (JP)

( * ) Notice: Subject to any disclaimer, the term of this patent is extended or adjusted under 35 U.S.C. 154(b) by 3 days.

(21) Appl. No.: 10/011,287

(22) Filed: Dec. 11, 2001

(65) Prior Publication Data

US 2002/0121626 A1 Sep. 5, 2002

(30) Foreign Application Priority Data

Dec. 14, 2000 (JP) ........................................ 2000-379989

(51) Int. Cl.$^7$ ............................................... C09K 19/52
(52) U.S. Cl. ..................................... 252/299.01; 264/21
(58) Field of Search ........................ 252/299.1, 299.67; 264/5, 21, 402, 403, 404, 405

(56) References Cited

U.S. PATENT DOCUMENTS 4,311,823 A  1/1982  Imai et al.
5,015,723 A  5/1991  Sugimoto et al.

FOREIGN PATENT DOCUMENTS

JP  55-94930  7/1980
JP  2-69518   3/1990

*Primary Examiner*—Mark F. Huff
*Assistant Examiner*—Jennifer R. Sadula
(74) *Attorney, Agent, or Firm*—Birch, Stewart, Kolasch & Birch, LLP

(57) ABSTRACT

A process for producing a thermotropic liquid crystalline polymer having a flow beginning temperature of 340° C. or more comprising raising the temperature of a thermotropic liquid crystalline polymer from 200° C. or less to raising end temperature (A° C.) of $(FT_0+50)°$ C. or more in substantially solid phase condition, wherein the thermotropic liquid crystalline polymer has a flow beginning temperature ($FT_0$) of 200° C. or more and 300° C. or less, and in a step of raising the resin temperature (t) from $(FT_0+20)°$ C. to $(FT_0+50)°$ C. (step (1)), the average raising speed of the resin temperature is from over 0.1° C./min. to less than 0.5° C./min. and the flow beginning temperature of the thermotropic liquid crystalline polymer at each resin temperature is (t−10)° C. or more and (t+40)° C. or less.

9 Claims, No Drawings

PROCESS FOR PRODUCING THERMOTROPIC LIQUID CRYSTALLINE POLYMER

BACKGROUND OF THE INVENTION

1. Field of the Invention

The present invention relates to a process for producing a thermotropic liquid crystalline polymer having a flow beginning temperature of 340° C. or more.

2. Description of the Related Art

Thermotropic liquid crystalline polymers are widely used as portable and thin electric and electronic parts materials due to excellent melt flowability and heat resistance.

Various methods are known for producing a thermotropic liquid crystalline resin.

For example, JP-A No. 2-69518 discloses a process for producing a whole aromatic polyester, and it is also disclosed that when a pre-polymer is polymerized in solid phase, it is necessary to select treating temperature and temperature raising speed so that particles of the resin are not sintered, and when sintered, polymerization is suppressed and removal of substances having low boiling point becomes insufficient.

Particularly, when producing a thermotropic liquid crystalline resin of high heat resistance having a flow beginning temperature of 340° C. or more by solid phase polymerization, it is difficult to effect solid phase polymerization so that particles of the resin are not sintered, and even when sintering of resin particles is few, blistering occurs on the surface of a molded article containing said resin under high temperature for soldering and the like.

SUMMARY OF THE INVENTION

An object of the present invention is to provide a process for producing a thermotropic liquid crystalline resin having a flow beginning temperature of 340° C. or more which does not cause sintering of resin particles in solid phase polymerization, and scarcely causes a problem of blistering of a molded article containing said resin under high temperature environment.

The present inventors have intensively studied to find a process for producing a thermotropic liquid crystalline resin having a flow beginning temperature of 340° C. or more which has no problems as described above, and resultantly found that, a thermotropic liquid crystalline resin having a flow beginning temperature of 340° C. or more can be produced without causing problems as described above by controlling the average temperature raising speed of resin temperature (t) in a specific range when raising the resin temperature (t) from $(FT_0+20)°$ C. to $(FT_0+50)°$ C. and controlling the flow beginning temperature of a thermotropic liquid crystalline resin at each resin temperature in a specific range, and have completed the present invention.

Namely, the present invention relates to a process for producing a thermotropic liquid crystalline polymer having a flow beginning temperature of 340° C. or more comprising raising the temperature of a thermotropic liquid crystalline polymer from 200° C. or less to raising end temperature (A° C.) of $(FT_0+50)°$ C. or more in substantially solid phase condition, wherein the thermotropic liquid crystalline polymer has a flow beginning temperature $(FT_0)$ of 200° C. or more and 300° C. or less, and in a step of raising the resin temperature (t) from $(FT_0+20)°$ C. to $(FT_0+50)°$ C. (step (1)), the average raising speed of the resin temperature is from over 0.1° C./min. to less than 0.5° C./min. and the flow beginning temperature of the thermotropic liquid crystalline polymer at each resin temperature is $(t-10)°$ C. or more and $(t+40)°$ C. or less.

DETAILED DESCRIPTION OF PREFERRED EMBODIMENTS

Embodiments of the present invention are described below. In the following descriptions, "heat resistance" of a resin means a thermomechanical and chemical heat resistance. As measure of thermomechanical heat resistance, deflection temperature under load is exemplified. As measure of chemical heat resistance, soldering resistance is exemplified. "Processability" of a resin means melt flowability of a resin in injection molding mainly.

The thermotropic liquid crystalline resin of the present invention is, for example, a whole aromatic thermotropic liquid crystalline resin such as polyesters or polyesteramides having a whole aromatic skeleton, and there are exemplified (1) resins having a structural unit derived from at least one aromatic hydroxycarboxylic acids, (2) resins having a structural unit derived from aromatic dicarboxylic acid and aromatic diol, (3) resins having a structural unit derived from aromatic hydroxycarboxylic acid, aromatic dicarboxylic acid and aromatic diol, (4) resins obtained by adding a structural unit derived from aromatic aminocarboxylic acid to (1), (5) resins obtained by adding a structural unit derived from aminophenols to (2) and (3), and the like, and the thermotropic liquid crystalline resin usually forms an anisotropic melted body at temperatures of 400° C. or less.

Examples of the structural unit of the above-mentioned polyesters or polyesteramides having a whole aromatic skeleton include, but not limited to, the following units.

Structural units derived from aromatic hydroxycarboxylic acid:

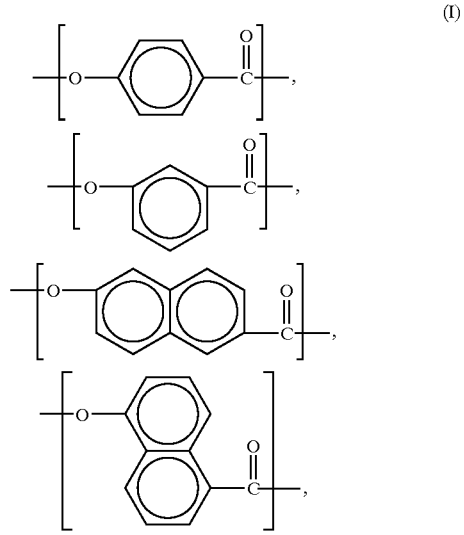

(I)

Structural units derived from aromatic diol:
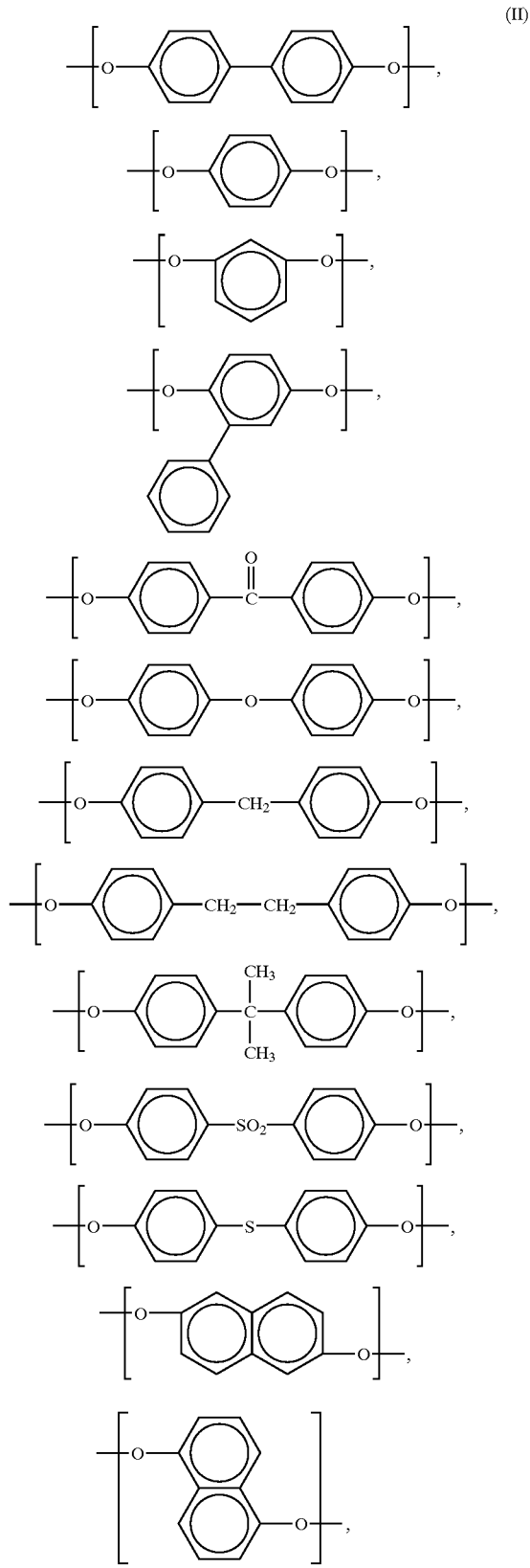
(II)
Structural units derived from aromatic dicarboxylic acid:
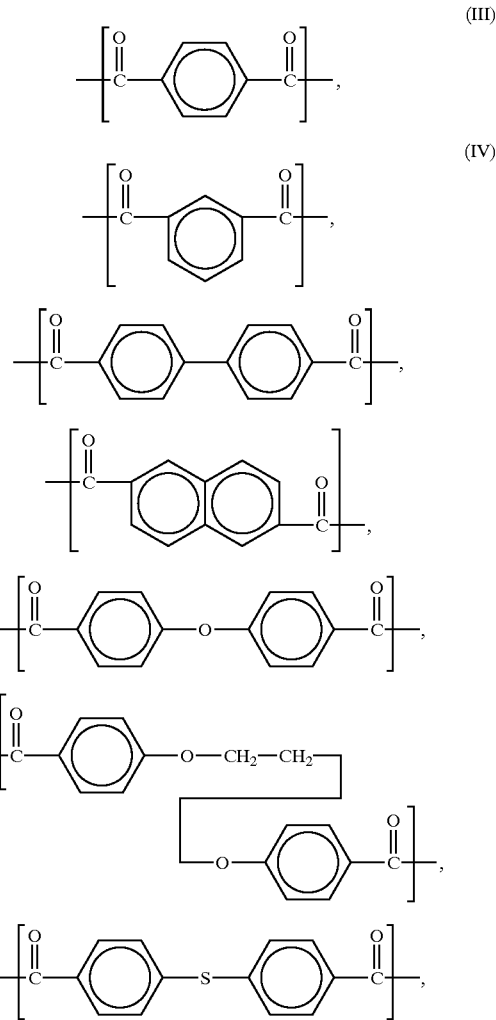
(III)
(IV)
Structural units derived from aromatic aminocarboxylic acid:
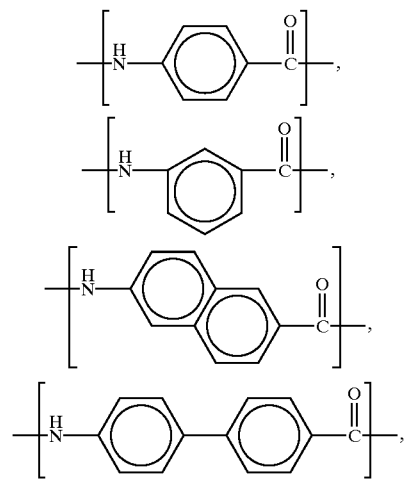

Structural units derived from aminophenols:

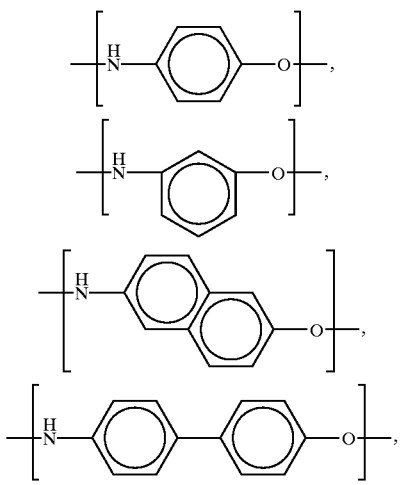

The above-mentioned structural units derived from aromatic hydroxycarboxylic acid, aromatic diol, aromatic dicarboxylic acid, aromatic aminocarboxylic acid and aminophenols may have a substituent such as halogen atom, alkyl group, aryl group and the like on aromatic ring.

Among them, those having a total content of the above-mentioned structural units (I), (II), (III) and (IV) of 95 mol % or more are preferable from the standpoint of balance of heat resistance and processability, and those consisting essentially of the above-mentioned structural units (I), (II), (III) and (IV) are more preferable. Other structural units than (I), (II), (III) and (IV) can be appropriately selected from structural units derived from aromatic hydroxycarboxylic acid, aromatic diol, aromatic dicarboxylic acid, aromatic aminocarboxylic acid and aminophenols.

The molar ratio of (III)/(IV) is preferably from 8 to 50. When a thermotropic liquid crystalline resin having (III)/(IV) of less than 8 is used, it may be difficult to obtain a resin having a flow beginning temperature of 340° C. or more without causing fusion of a resin even if polymerization is effected according to the present invention. When (III)/(IV) is over 50, processability may be poor. From the standpoint of balance of sufficient heat resistance and processability, (III)/(IV) is more preferably from 18 to 40, and further preferably from 15 to 30.

The molar ratio of (I)/((I)+(II)+(III)+(IV)) is preferably from 0.4 to 0.7. When (I)/((I)+(II)+(III)+(IV)) is less than 0.4, the heat resistance of the thermotropic liquid crystalline resin may lower. When over 0.7, processability may be poor. From the standpoint of balance of sufficient heat resistance and processability, (I)/((I)+(II)+(III)+(IV)) is further preferably from 0.45 to 0.55.

The molar ratio of (II)/((III)+(IV)) is preferably from 0.9 to 1.1. When (II)/((III)+(IV)) is less than 0.9 or over 1.1, it may be difficult to obtain a resin having a flow beginning temperature of 340° C. or more without causing fusion of a resin even if polymerization is effected according to the present invention.

The objective of the present invention is to provide a thermotropic liquid crystalline resin having a flow beginning temperature of 340° C. or more. From the standpoint of processability of the resin, the flow beginning temperature is preferably 400° C. or less. When higher balance of heat resistance and processability is desired, the flow beginning temperature of the resin is more preferably from 370° C. to 390° C.

A process for producing a thermotropic liquid crystalline resin having a flow beginning temperature $FT_0$ of 200° C. or more and 300° C. or less before initiation of temperature raising (hereinafter, this resin is sometimes referred to as pre-polymer) used in the present invention is not particularly restricted. There is exemplified a process in which a hydroxyl group and an amino group of aromatic hydroxycarboxylic acids, aromatic diols, aromatic aminocarboxylic acids or aromatic aminophenols are acylated with an acylating agent such as acetic anhydride and the like, and poly-condensation is effected together with aromatic dicarboxylic acids while distilling off unreacted acylating agents and an acid by-produced. It is preferable that the resulted poly-condensed substance is recovered in melted condition from a reaction vessel, solidified by cooling, then, ground to give a granule of a prepolymer, or solidified by cooling from melted condition into a string which is cut to give a pellet of a prepolymer.

In the present invention, a granule or pellet of a prepolymer has a particle diameter of preferably 10 mm or less, further preferably 5 mm or less. When the particle diameter of a granule or pellet is over 10 mm, it may be insufficient to remove substances having a lower boiling point such as an acid by-produced by poly-condensation when poly-condensation is conducted in solid phase.

An apparatus used in the present invention is not particularly restricted, and generally known heat treatment apparatuses and drying machines can be used. As examples thereof, a compartment oven, rotary kiln, fluidized bed type drier and the like are listed. It is preferable to use them under a nitrogen atmosphere.

The process for producing a thermotropic liquid crystalline polymer of the present invention is a process comprising raising the temperature of a thermotropic liquid crystalline polymer having a flow beginning temperature $FT_0$ of 200° C. or more and 300° C. or less before initiation of temperature raising, from the temperature raising initiation temperature of 200° C. or less to raising end temperature (A° C.) of $(FT_0+50)$° C. or more in substantially solid phase condition. The characteristics of the present invention is that, in a step of raising the resin temperature (t) from $(FT_0+20)$° C. to $(FT_0+50)$° C. (step (1)), temperature raising is effected so that the average raising speed of the resin temperature is in the range of from over 0.1° C./min. to less than 0.5° C./min. and the flow beginning temperature of the thermotropic liquid crystalline polymer at each resin temperature is in the range of from $(t-40)$° C. or more to $(t+10)$° C. or less. Preferably, in the step (1), raising speed of the resin temperature is substantially stable.

Here, the flow beginning temperature is a temperature at which when a resin heated at a temperature raising speed of 4° C./min. is extruded from a nozzle having a internal diameter of 1 mm and a length of 10 mm under a load of 9.81 MPa, the melt viscosity shows a value of 4800 Pa·s.

When the average temperature raising speed is 0.1° C./min. or less, there may occur problems that the flow beginning temperature of a thermotropic liquid crystalline resin does not reach 340° C. or more; a longer time is required for sufficiently progressing polymerization and removal of a substance having a lower boiling point; thermal coloring occurs; and the like. When the average temperature raising speed is 0.5° C./min. or more, a resin is sintered and grinding into a granule may become difficult, and even if sintering does not occur, problems on physical properties may occur.

The raising end temperature (A° C.) is preferably $(FT_0+100)$° C. or less, and further preferably $(FT_0+80)$° C. or less, for uniform polymerization of a granule or pellet of a resin.

In the step (1), a resin is so heated that the flow beginning temperature (FT) of a thermotropic liquid crystalline resin at each resin temperature (t) is (t−10)° C. or more and (t+40)° C. or less. Even if the average temperature raising speed is in the above-mentioned range, when FT is over (t+40)° C., polymerization and removal of a substance having a lower boiling point may become insufficient. When FT is lower than (t−10)° C., a resin is sintered and grinding into a granule may become difficult, and even if sintering does not occur, problems on physical properties may occur.

For example, a method which satisfies conditions such as the above-mentioned resin temperature and flow beginning temperature includes a method in which a resin having flow beginning temperature of 260° C. in which (I): (II): (III): (IV)=500:250:237:13 heated up to 230° C. over 70 minutes, subsequently heated up to 330° C. over 300 minutes.

Further, it is preferable that the process of the present invention further comprises a step (2) in which the resin temperature is lower to 200° C. or less after the resin temperature reaches the raising end temperature (A° C.). The average temperature lowering speed is not particularly restricted, and preferably 0.5° C./min. or more when the temperature is 200° C. or less.

Further, it is preferable that the process of the present invention further comprises a step (3) in which thermal treatment is conducted for 1 hour or more at a resin temperature within A° C.±10° C. and a variation of a resin temperature within ±0.1° C./min. after the resin temperature reaches the raising end temperature (A° C.).

By adding the step (3), the molecular weight distribution becomes narrower and polymerization and removal of a substance having a lower boiling point can be attained sufficiently, by uniform polymerization of a granule or pellet of a resin.

Furthermore, it is preferable that the process of the present invention further comprises a step (4) in which the resin temperature is raised from any temperature of not more than 200° C. and less than $(FT_0-40)°$ C. to any temperature of $(FT_0-40)°$ C. or more and $(FT_0+20)°$ C. or less at an average temperature raising speed of 0.5° C./min. or more, before the step (1). By adding the step (4), the treating time can be shortened. Particularly, when raising of the resin temperature is initiated from normal temperature (around 20° C.), and the like, it is more preferable to conduct temperature raising at a rate in the range from 3° C./min. to 10° C./min. for the purpose of shortening of the treating time, and the like.

When raising temperature at an average temperature raising speed of 0.5° C./min. or more up to temperature over $(FT_0+20)°$ C., a resin is sintered and grinding into a granule may become difficult. When temperature is lower than $(FT_0-40)°$ C., the heat treatment time may become longer. In the step (4), it is more preferable that temperature raising is effected at substantially constant speed.

As a method of introducing a resin into the step (4), the following methods are listed.

(a) A method in which a resin leveled on a tray is introduced into a compartment type oven, then, heated at a temperature raising speed of 0.5° C./min. or more up to a temperature of not more than $(FT_0+20)°$ C.

(b) A method in which a resin is introduced into a rotary kiln pre-heated to a temperature of not more than the flow beginning temperature $(FT_0+20)°$ C. of the resin.

(c) A method in which a resin is continuously introduced into a fluidized bed type drier having a resin introduction port controlled at a temperature of not more than the flow beginning temperature $(FT_0+20)°$ C. of the resin.

(d) A method in which a resin is introduced into a tunnel type conveyor furnace having temperature distribution, having a resin introduction port controlled at a temperature of not more than the flow beginning temperature $(FT_0+20)°$ C. of the resin.

In the present invention, a metal oxide, organic metal salt, organic base compound and the like may be used as a polymerization catalyst. Examples thereof include, but are not limited to, oxides, acetates, oxalates and the like of germanium, tin, titanium, antimony, cobalt, manganese and the like.

In the present invention, an antioxidant, thermal decomposition-preventing agent, hydrolysis-preventing agent, ultraviolet absorber, flame retardant and the like can be added to a pre-polymer in an amount which does not deteriorate the object of the present invention and which does not exert a reverse influence on physical properties.

The thermotropic liquid crystalline resin composition of the present invention is obtained by compounding 10 to 100 parts by weight of an inorganic substance per 100 parts by weight of a thermotropic liquid crystalline resin according to the present invention.

As the inorganic substance to be compounded according to the object, general inorganic fibers such as glass fiber, carbon fiber, metal fiber, alumina fiber, boron fiber, titanic acid fiber, asbestos and the like; powder substances such as calcium carbonate, alumina, aluminum hydroxide, kaolin, talc, clay, mica, glass flake, glass bead, quartz sand, silica sand, wollastonite, dolomite, various metal powders, carbon black, graphite, barium sulfate, potassium titanate, calcined gypsum and the like; granules or plate inorganic compound such as silicon carbide, alumina, boronite light, silicon nitride and the like; whisker and the like are listed. Among them, glass fiber and carbon fiber are preferably used from the standpoints of strength, rigidity and heat resistance of a molded article obtained by molding the composition. A thermotropic liquid crystalline resin into which the above-mentioned inorganic substance is not compounded may not be used for obtaining a molded article having stable form due to excess anisotropy.

In this composition, an antioxidant, thermal decomposition-preventing agent, hydrolysis-preventing agent, ultraviolet absorber, antistatic agent, coloring agent (pigment, dye), surface treating agent, conductor, flame retarder, lubricant, releasing agent, plasticizer, adhesion aid, sticking agent and the like can be added in an amount which does not deteriorate the object of the present invention and which does not exert a reverse influence on physical properties.

Further, a small amount of thermoplastic resin, for example, polyamide, polyester, polyphenylene sulfide, polyether ketone, polycarbonate, polyphenylene ether and modified resins thereof, polysulfone, polyether sulfone, polyether imide and the like, and a small amount of thermosetting resin, for example, a phenol resin, epoxy resin, polyimide resin and the like can also be added alone or in combination thereof.

When the thermotropic liquid crystalline resin composition of the present invention is processed into moldings, the deflection temperature under load of this moldings is preferably 300° C. or more.

In the case of use in a coil bobbin which is soldered by direct immersion into a melted solder, supporting members for electric heat bodies and light and heat instruments of high temperature, and the like, the deflection temperature under load is preferably 330° C. or more, and more preferably 350° C. or more.

EXAMPLES

The following examples illustrate the present invention, but do not restrict the scope of the invention. The flow beginning temperature, deflection temperature under load, flexural strength, and soldering resistance were measured according to the following processs, in the examples.

(1) Flow Beginning Temperature

A resin heated at a temperature raising speed of 4° C./min. was extruded from a nozzle having an internal diameter of 1 mm and a length of 10 mm at a load of 100 kgf/cm$^2$ (9.81 MPa) using a falling mode flow tester: type CFT-500 manufactured by Shimadzu Corp. A temperature when the melt viscosity was 48000 poise (4800 Pa·s) was recorded as the flow beginning temperature.

(2) Flexural Strength

A specimen having a length of 127 mm, a width of 12.7 mm and a thickness of 6.4 mm was made using an injection molding machine, and the flexural strength was measured using this specimen according to ASTM D790.

(3) Deflection Temperature Under Load

A specimen having a length of 127 mm, a width of 6.4 mm and a thickness of 12.7 mm was made using an injection molding machine, and the deflection temperature under load was measured using this specimen according to ASTM D648, at a load of 18.6 kg/cm$^2$ (1.82 MPa) and a temperature raising speed of 2° C./min.

(4) Soldering Resistance

A JIS K7113 (½) dumbbell specimen (thickness: 1.2 mm) was made using an injection molding machine, and ten or more specimens were immersed in a solder bath composed of 60% of tin and 40% of lead heated at 300° C. for 60 seconds, and the ratio (%) of specimens which revealed change in appearance such as blistering, deformation and the like after removal from the bath was recorded as soldering resistance. When this ratio is smaller, resistance to solder immersion is higher.

(5) Sintering Strength of Resin

A block (thickness: about 1.5 cm, area: about 80 cm$^2$) of a thermotropic liquid crystalline resin powder after temperature raising treatment under given conditions was loaded from upper direction via a disk of 28 cm, and the pressure at which the block was broken was measured. When this pressure is higher, fusion of a resin is stronger.

Reference Example 1

Production Examples of Thermotropic Liquid Crystalline Resin (Prepolymer)

Into a vessel equipped with a reflux condenser, thermometer, nitrogen introducing tube and stirring blade was charged p-hydroxybenzoic acid: 828.7 g,
4.4'-dihydroxybiphenyl: 558.6 g,
terephthalic acid: 473.5 g,
isophthalic acid: 24.9 g and
acetic anhydride: 1347.6 g, then, the mixture was heated up to about 140° C. and stirred for 3 hours under reflux condition. Then, acetic acid was distilled off while heated up to about 310° C., and kept for 1 hour at about 310° C. and distilling off of acetic acid was continued, to obtain about 1600 g of a prepolymer. The resulted prepolymer was cooled and ground by a grinder to a particle size of 3 mm or less.

Example 1

A thermotropic liquid crystalline resin having a flow beginning temperature of 260° C. in which (I):(II):(III):(IV)=500:250:237:13 produced according to Reference Example 1 was placed on a SUS tray and leveled to give a thickness of 1.5 cm and introduced into a hot air circulation type oven under room temperature condition. The atmosphere in the oven was purged with nitrogen, then, the temperature of a gas phase immediately above the resin was heated up to 230° C. over 70 minutes, subsequently heated up to 330° C. over 300 minutes, then, kept at 330° C. for 180 minutes. The resin temperature was within the range of 330° C.±10° C. and the variation of the resin temperature was within ±0.1° C./min, during this temperature keeping step.

During this heat treatment operation, a thermocouple was introduced into the resin and the resin temperature was measured to confirm that it followed the temperature of a gas phase part. The temperature raising speed from 280° C. to 310° C. was 0.3° C./min.

The powder after this heat treatment operation had a sintering strength of less than 1 kg/cm and a flow beginning temperature of 383° C., measured according to the above-mentioned processs.

To 60 parts by weight of this resin was mixed 40 parts by weight of glass fiber (manufactured by Nippon Sheet Glass Co., Ltd., REV-8), then, the mixture was granulated using a twin screw extruder (manufactured by Ikegai Iron works, PCM-30) at a cylinder temperature of 390° C., and a thermotropic liquid crystalline resin composition was obtained.

This thermotropic liquid crystalline resin composition was molded by an injection molding machine (manufactured by Nissei Plastic Industrial Co., Ltd., PS40E5ASE) at a cylinder temperature of 400° C., a mold temperature of 130° C., an injection speed of 50 to 80% and a pressure of 20 to 60%, to give the above-mentioned specimen, and the deflection temperature under load, flexural strength and soldering resistance thereof were measured, to obtain the following results.

Deflection temperature under load: 349° C.
Flexural strength: 129 MPa
Soldering resistance: 0%

Relation Between Flow Beginning Temperature (FT) and Resin Temperature

The same operation as in the above-mentioned Example 1 was repeated until the temperature of a gas phase above a resin reached 280° C., and heat treatment was stopped after the repetition, and removed immediately from an oven and cooled. Resins were heated up to 290, 300, 310 and 330° C., respectively, and removed, according to the same procedure.

The flow beginning temperature was measured on all resins, and regarding the resin which had been heated up to 310° C. before removal, the resin sintering strength was also measured before measurement of the flow beginning temperature, to give results in Table 1.

TABLE 1

| Resin temperature | Flow beginning temperature (FT) | Sintering strength |
|---|---|---|
| 280° C. | 276° C. | |
| 290° C. | 287° C. | |
| 300° C. | 298° C. | |
| 310° C. | 312° C. | <1 kg/cm$^2$ |
| 330° C. | 345° C. | |

Comparative Example 1

A thermotropic liquid crystalline resin having a flow beginning temperature of 260° C. in which (I):(II):(III):

(IV)=500:250:237:13 produced according to Reference Example 1 was placed on a SUS tray and leveled to give a thickness of 1.5 cm and introduced into a hot air circulation type oven under room temperature condition. The atmosphere in the over was purged with nitrogen, then, the temperature of a gas phase immediately above the resin was heated up to 230° C. over 70 minutes, subsequently heated up to 330° C. over 180 minutes, then, kept at 330° C. for 180 minutes.

During this heat treatment operation, a thermocouple was introduced into the resin and the resin temperature was measured to confirm that it followed the temperature of a gas phase part. The temperature raising speed from 280° C. to 310° C. was 0.6° C./min.

After this heat treatment operation, a thermotropic liquid crystalline resin powder sintered strongly was obtained. The sintering strength thereof measured according to the above-mentioned process was 4.5 kg/cm², and it had to be ground by a grinder again, to be used as a powder.

This sintered resin was ground by using a grinder, and the flow beginning temperature thereof measured according to the above-mentioned process was 384° C.

To 60 parts by weight of this resin was mixed 40 parts by weight of glass fiber (manufactured by Nippon Sheet Glass Co., Ltd., REV-8), then, the mixture was granulated using a twin screw extruder (manufactured by Ikegai Tekko K.K. PCM-30) at a cylinder temperature of 390° C., and a thermotropic liquid crystalline resin composition was obtained.

This thermotropic liquid crystalline resin composition was molded by an injection molding machine (manufactured by Nisshin Jushi Kogyo K.K., PS40E5ASE) at a cylinder temperature of 400° C., a mold temperature of 130° C., an injection speed of 50 to 80% and a pressure of 20 to 60%, to give the above-mentioned specimen, and the deflection temperature under load, flexural strength and soldering resistance thereof were measured, to obtain the following results.

Deflection temperature under load: 349° C.
Flexural strength: 131 MPa
Soldering resistance: 10%

Relation Between Flow Beginning Temperature (FT) and Resin Temperature

The same operation as in the above-mentioned Comparative Example 1 was repeated until the temperature of a gas phase above a resin reached 280° C., and heat treatment was stopped after the repetition, and removed immediately from an oven and cooled. Resins were heated up to 290, 300, 310 and 330° C., respectively, and removed, according to the same procedure.

The flow beginning temperature was measured on all resins, and regarding the resin which had been heated up to 310° C. before removal, the resin sintering strength was also measured before measurement of the flow beginning temperature, to give results in Table 2.

TABLE 2

| Resin temperature | Flow beginning temperature (FT) | Sintering strength |
|---|---|---|
| 280° C. | 270° C. | |
| 290° C. | 277° C. | |
| 300° C. | 285° C. | |

TABLE 2-continued

| Resin temperature | Flow beginning temperature (FT) | Sintering strength |
|---|---|---|
| 310° C. | 298° C. | 2.3 kg/cm² |
| 330° C. | 331° C. | |

The thermotropic liquid crystalline resin produced by the production process of the present invention shows easy handling property without fusion of a resin and has excellent heat resistance, and a molded article made of this resin scarcely manifest problems such as blistering and the like, even under high temperature atmosphere. Therefore, this resin is extremely useful for parts of domestic electric appliances, table wares, medical apparatuses, OA and AV machines, electric and electronic apparatuses and the like which are required to have heat resistance, for example, a coil bobbin soldered by direct immersion into a melted solder, supporting members for electric heat bodies and light and heat instruments of high temperature.

What is claimed is:

1. A process for producing a thermotropic liquid crystalline polymer having a flow beginning temperature of 340° C. or more comprising raising the temperature of a thermotropic liquid crystalline polymer from 200° C. or less to raising end temperature (A° C.) of $(FT_0+50)°$ C. or more in substantially solid phase condition, wherein the thermotropic liquid crystalline polymer has a flow beginning temperature $(FT_0)$ of 200° C. or more and 300° C. or less, and in a step of raising the resin temperature (t) from $(FT_0+20)°$ C. to $(FT_0+50)°$ C. (step (1)), the average raising speed of the resin temperature is from over 0.1° C./min. to less than 0.5° C./min. and the flow beginning temperature of the thermotropic liquid crystalline polymer at each resin temperature is $(t-10)°$ C. or more and $(t+40)°$ C. or less.

2. The process according to claim 1, wherein the process further comprises a step (2) in which the resin temperature is lowered to 200° C. or less after the resin temperature reaches the temperature raising end temperature (A° C.).

3. The process according to claim 1, wherein the process further comprises a step (3) in which thermal treatment is conducted for 1 hour or more at a resin temperature within A° C.±10° C. and a variation of a resin temperature within ±0.1° C./min after the resin temperature reaches the temperature raising end temperature (A° C.).

4. The process according to claim 1, wherein the process further comprises a step (4) in which the resin temperature is raised from a temperature of from not more than 200° C. and less than $(FT^0-40)°$ C. to a temperature of $(FT_0-40)°$ C. or more and $(FT_0+20)°$ C. or less at an average temperature raising speed of 0.5° C./min. or more, before the step (1).

5. The process according to claim 1, wherein the thermotropic liquid crystalline polymer is an aromatic polyester comprising the following structural units (I) to (IV):

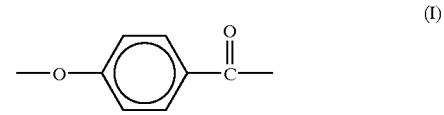

(I)

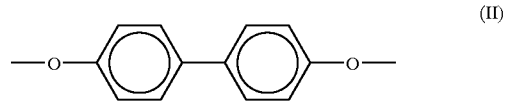

(II)

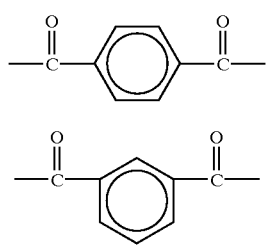

wherein, the molar ratio of (I)/((I)+(II)+(III)+(IV)) is 0.4 to 0.7, the molar ratio of (II)/((III)+(IV)) is 0.9 to 1.1, and the molar ratio of (III)/(IV) is 8 to 50.

6. The process according to claim 5, wherein the molar ratio of (III)/(IV) is 18 to 40.

7. A thermotropic liquid crystalline polymer obtained by the process according to claim 1.

8. A thermotropic liquid crystalline polymer composition comprising 100 parts by weight of the thermotropic liquid crystalline polymer according to claim 7 and 10 to 100 parts by weight of an inorganic material.

9. A molded body having a deflection temperature under load of 300° C. or more obtained by molding the thermotropic liquid crystalline polymer composition according to claim 8.

* * * * *